1,219,568. Patented Mar. 20, 1917.

UNITED STATES PATENT OFFICE.

HAROUTIUN K. KOUYOUMJIAN, OF CLEVELAND, OHIO, ASSIGNOR TO THE KEMCO ELECTRIC MANUFACTURING COMPANY, OF CLEVELAND, OHIO, A CORPORATION OF OHIO.

MOTOR-VEHICLE CONSTRUCTION.

1,219,563.   Specification of Letters Patent.   Patented Mar. 20, 1917.

Application filed July 19, 1913. Serial No. 780,080.

*To all whom it may concern:*

Be it known that I, HAROUTIUN K. KOUYOUMJIAN, a subject of the Sultan of Turkey, residing at Cleveland, in the county of Cuyahoga and State of Ohio, have invented certain new and useful Improvements in Motor-Vehicle Construction, of which the following is a specification.

This invention relates generally to motor vehicle structures and particularly to the cooling system for the engine and to the electric generating plant.

More specifically, the invention relates to a combined radiator cooling fan and electric generator, arranged in a single unit whereby the drive of the fan serves as a drive for the generator, and further whereby the presence of the generator in the fan is utilized to increase the efficiency of that factor and the presence of the fan blades about the generator, increases the efficiency of the generator by maintaining the lowest possible temperature for the generator in the hood of the car.

The invention may be further briefly summarized as consisting in the construction and combination of parts hereinafter set forth in the following description, drawings and claims:—

Figure 1:
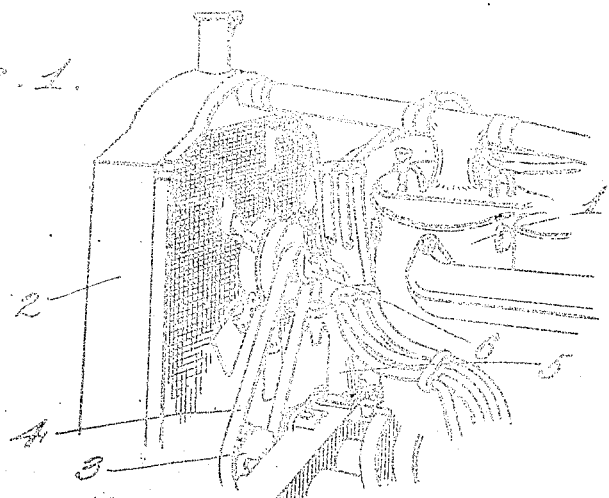
Figure 2:
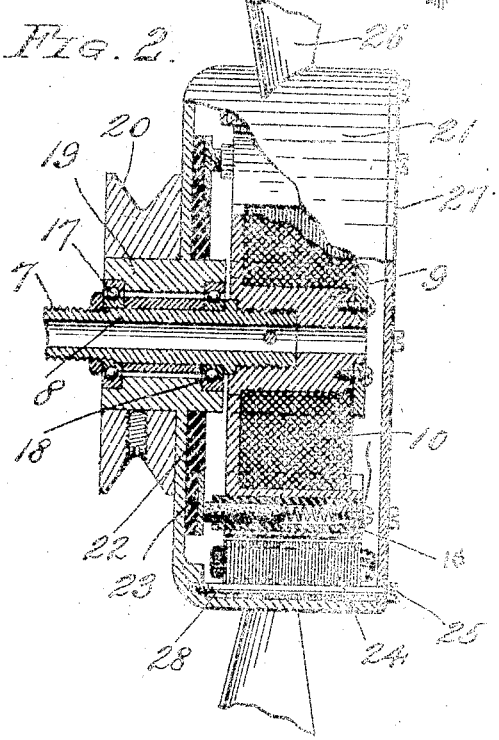
Figure 3:
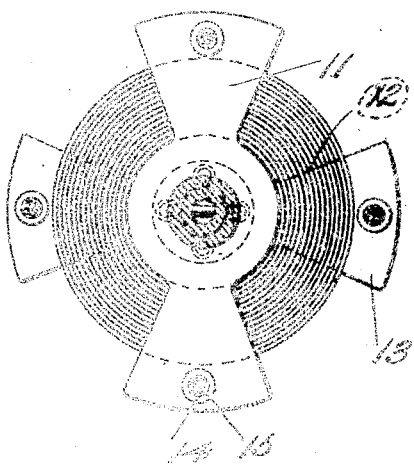

Referring to the drawings, Figure 1 is a perspective view of a portion of a motor vehicle engine and radiator, showing my improved radiator cooling fan and generator in place; Fig. 2 is a side elevation of the device, and partly in section showing the field magnet. Fig. 3 is a detail view of the field magnet.

I carrying out the invention, any preferred form of construction of motor vehicle may be arranged according to my invention, provided it possesses the necessary characteristics, but I have shown one arrangement in the drawings wherein 1 represents a suitable engine, 2 a radiator, and 3 the driving pulley, driven by the engine and arranged to drive, with a suitable belt 4, the combined cooling fan and generator, to be described.

Mounted upon the frame of the engine is a suitable supporting bracket 5, carrying a fan supporting member 6, which is adapted to receive the threaded end 7, of a hollow supporting shaft 8. This shaft carries at its outer end a field magnet, comprising a central core 9, a winding 10, and field frame members 11, and 12, which are arranged at opposite ends of the core 9, so that the pole pieces are interspersed about the periphery of the winding. The pole pieces are bored out to receive insulating tubes 14, which receive carbon brushes 15, normally pressed outward by means of suitable springs 16. The brushes extend out on one side of the magnetic field as shown.

Rotatably mounted on the hollow shaft 8 and preferably by means of ball bearings 17 and 18 is a casing sleeve 19, carrying a driving pulley 20 and a casing member 21, extending over the field magnet. Secured in the back of the casing is a suitable commutator 22, provided with commutator segments 23, adapted for engagement by the brushes 15. Secured within the casing 21, is a laminated armature 24, provided with suitable windings 25. In connecting the generator, suitable leads not shown, are led through the hollow shaft and are connected to the proper brush holders, like brush holders being connected together. A field winding is then connected as a shunt winding. The commutator segments are connected in any suitable manner not shown to the armature winding. Secured to the periphery of the casing 21, are suitable fan blades 26, which are adapted to draw air through the radiator. The casing 21, is also provided with a cover 27, secured to the front thereof in any suitable manner, as by bolts 28, passing therethrough and threaded into the casing.

In operation, the ordinary drive for the fan, which in this case is the driving pulley 3, transmits motion to the belt 4, which in turn drives the pulley 20 and through it the casing 21, with the result that the armature and commutator are rotated with respect to the magnetic field, thus accomplishing two purposes, cooling the radiator by means of the fan blades and generating electricity for lighting, starting and other purposes. By reason of this construction, the combination of the generator and cooling fan increases the efficiency of both factors, since the generator prevents a back draft through the center of the fan and the fan blades produce a circulation of air about the generator.

Having described my invention, I claim:

1. In combination with the chassis of a motor vehicle including the engine and radiator, of a combined radiator cooling fan and generator unit mounted between the engine and radiator and including a generator and fan blades arranged to rotate with the rotary element of the generator, said unit being supported solely at one end which is next to the engine, a support for said unit mounted on said chassis at the front of the engine, and a driving pulley at the inner end of said unit close to said support.

2. In combination with the chassis of a motor vehicle including the engine and radiator, of a combined radiator cooling fan and generator unit mounted between the engine and radiator and including a generator and fan blades arranged to rotate with the rotary element of the generator, said unit being supported solely at one end which is next to the engine, a support for said unit at the front of the engine but independent of the latter, and a driving pulley at the inner end of the said unit close to said support.

HAROUTIUN K. KOUYOUMJIAN.

Witnesses:
G. O. FARQUHARSON,
B. W. BROCKETT.